United States Patent [19]

Huang

[11] Patent Number: 5,333,602
[45] Date of Patent: Aug. 2, 1994

[54] SOLAR COLLECTOR ASSEMBLY

[76] Inventor: Shao-Kuang Huang, No. 4, Sec. 2, Ching-Tao Rd.,, Taichung, Taiwan

[21] Appl. No.: 118,251

[22] Filed: Sep. 9, 1993

[51] Int. Cl.5 .............................................. F24J 2/38
[52] U.S. Cl. ................................ 126/608; 126/704
[58] Field of Search ............................ 126/600, 608

[56] References Cited

U.S. PATENT DOCUMENTS 4,066,062  1/1978  Houston ........................... 126/600

*Primary Examiner*—Carroll B. Dority
*Attorney, Agent, or Firm*—Bacon & Thomas

[57] ABSTRACT

A solar collector assembly comprised of a solar collector unit, which includes a solar collector panel disposed within a housing thereof, an elevation adjustment unit mounted around the housing and controlled to tilt the housing in the longitudinal axis for adjusting the angle of elevation of the housing, and a focusing adjustment unit fastened to the collector panel and controlled to oscillate the collector panel sideways for adjusting the angle of inclination of the collector panel.

2 Claims, 6 Drawing Sheets

SOLAR COLLECTOR ASSEMBLY

BACKGROUND OF THE INVENTION

The present invention relates to a solar collector assembly for use in a solar heating system which can be conveniently adjusted to change the angle of elevation as well as the angle of inclination of the solar collector panel to efficiently absorb solar radiation.

Various solar collector assemblies are known, and widely used for the absorption of solar radiation for the heating of water. The solar collector assemblies shown in FIGS. 1 and 2 are similar. These solar collector assemblies can not be adjusted to change the angle of elevation and the angle of inclination. Therefore, these solar collector assemblies are less effective.

FIG. 3 illustrates an inductor controlled self-adjustment solar collector assembly which automatically adjusts the angle of inclination of the solar collector panel according to the position of the sun. This inductor controlled self-adjustment solar collector assembly comprises a photoresistance inductor to detect the position of the sun, a motor controlled by the photoresistance inductor to pump water between two water tanks on two opposite sides of the solar collector panel thereof, and therefore the solar collector panel is turned leftward or rightward to the angle of inclination perpendicular to the the sun. However, this inductor controlled self-adjustment solar collector assembly is still not satisfactory in function because of the following drawbacks
i) this structure of solar collector assembly must be sealed inside a box to protect its electric circuit against weather.
ii) the installation of the motor and the water tanks and the related pipings greatly increase the size and manufacturing cost of the solar collector assembly.
iii) water in the water tanks may be evaporated by the radiating energy of the sun, causing the motor unable to bias the solar collector panel.
iv) the solar collector panel can not be adjusted in the longitudinal direction, namely, the angle of elevation of the solar collector panel can not be adjusted.

SUMMARY OF THE INVENTION

The present invention has been accomplished under the aforesaid circumstances. It is therefore the principal object of the present invention to provide a solar collector assembly which can be oscillated in the transverse direction as well as the longitudinal direction for changing its angle of elevation and angle of inclination. It is another object of the present invention to provide a solar collector assembly which can be conveniently installed in any of a variety of buildings without the need of special techniques and mounting apparatus.

According to the preferred embodiment of the present invention, the solar collector assembly is comprised of a housing internally insulated by a heat-insulating box, a solar collector panel disposed inside the housing and covered by transparent cover plates, an elevation adjustment unit fastened to the housing and controlled to tilt the housing in the longitudinal direction for changing its angle of elevation, and a focusing adjustment fastened to the solar collector panel and controlled to turn the solar collector panel sideways in the transverse direction for changing its angle of inclination.

DETAILED DESCRIPTION OF THE PREFERRED EMBODIMENT

A solar collector assembly in accordance with the preferred embodiment of the present invention is generally comprised of a collector unit, an elevation adjustment unit, and a focusing adjustment unit.

Figure 1:
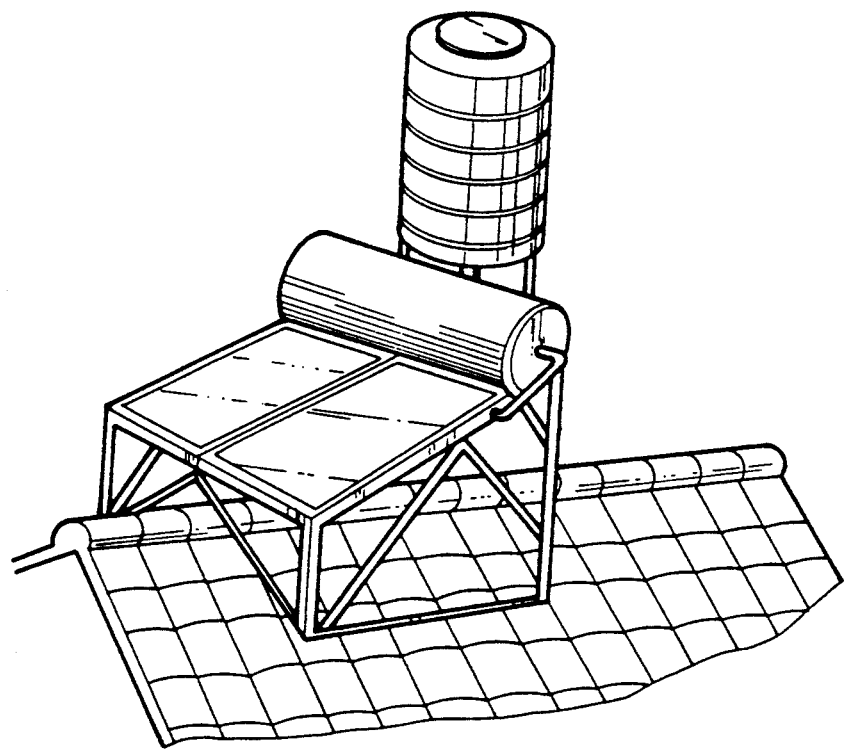
FIG. 1 illustrates a prior art solar collector assembly mounted on the roof of a building.
Figure 2:
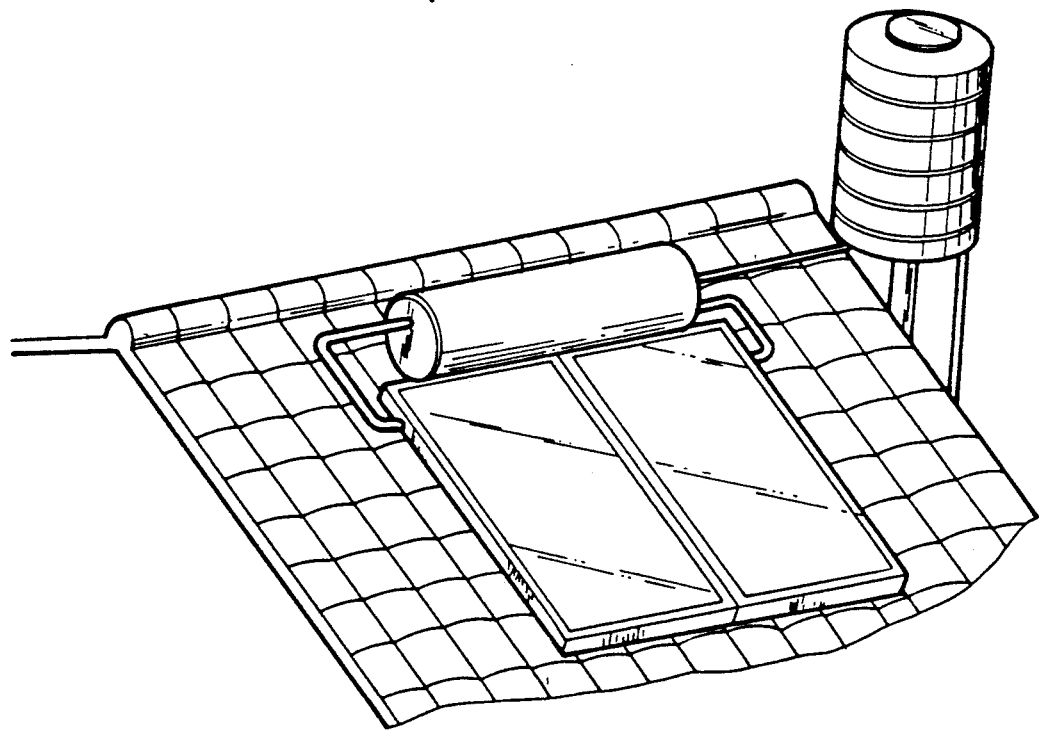
FIG. 2 illustrates another prior art solar collector assembly mounted on the rood of a building.
Figure 3:
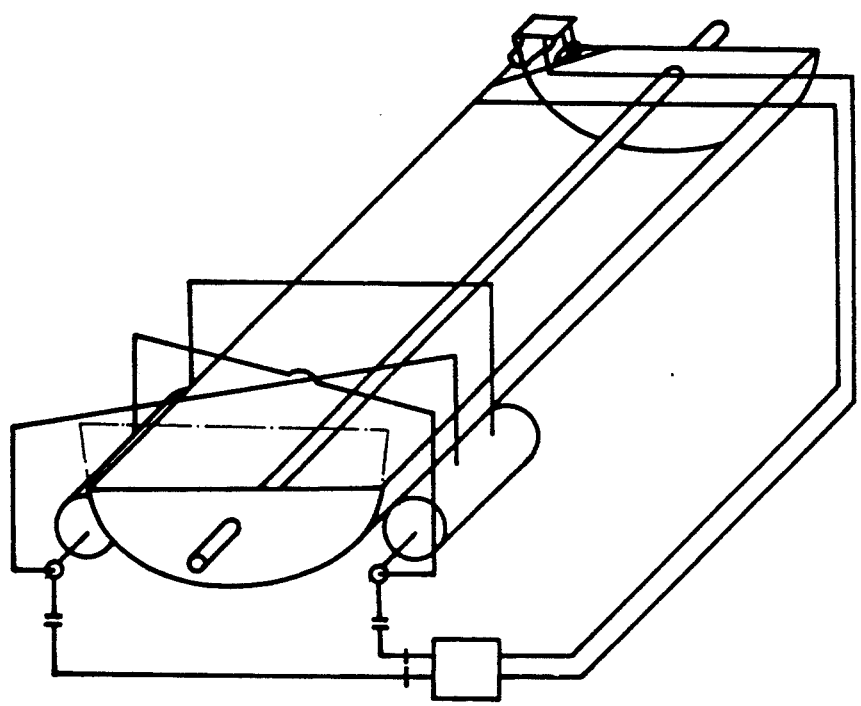
FIG. 3 illustrates an inductor controlled self-adjustment solar collector assembly according to the prior art.
Figure 4:
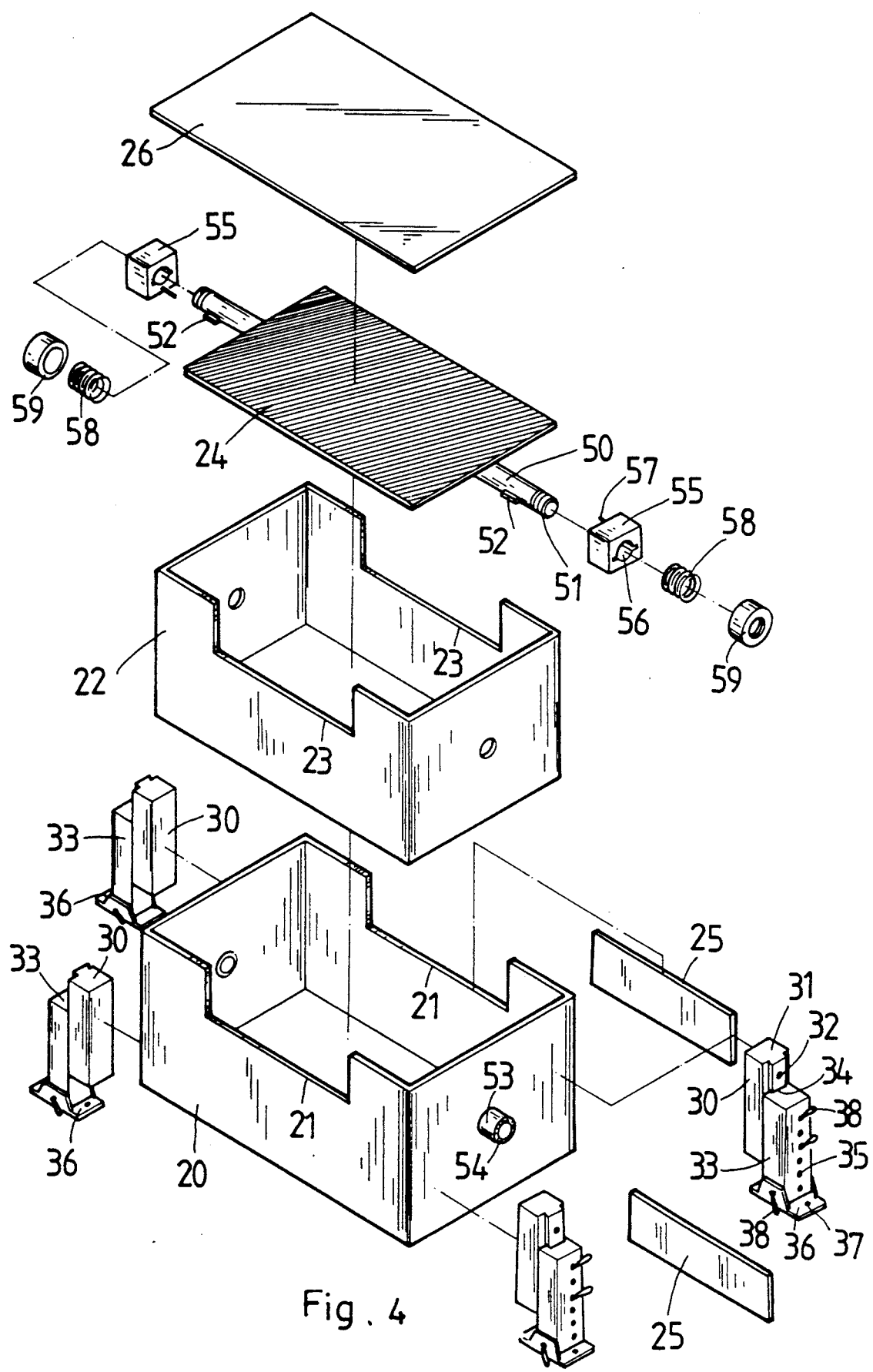
FIG. 4 is an exploded view of a solar collector assembly according to the preferred embodiment of the present invention.
Figure 5:
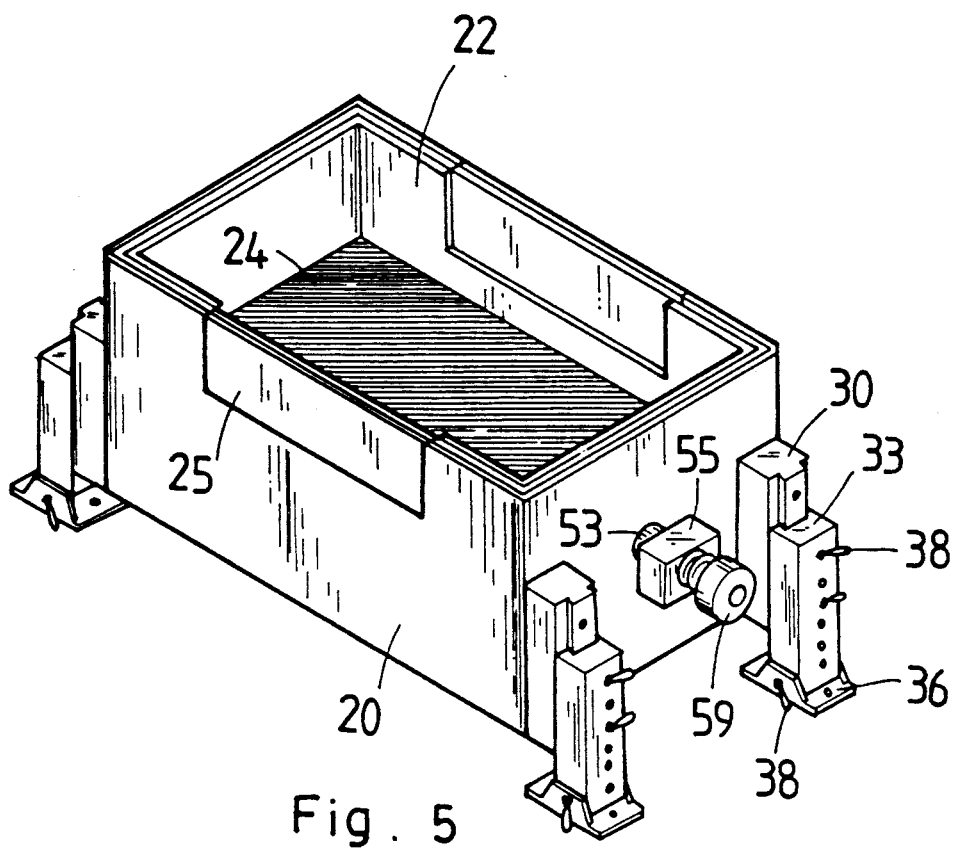
FIG. 5 is an elevational view of the solar collector assembly of FIG. 4.

Referring to FIGS. 4 and 5, the collector unit is comprised of a housing 20, a heat-insulating inner box 22, a collector panel 24, two transparent side cover plates 25, and a transparent top cover plate 26. The housing 20 is made in the shape of a rectangular top-open box, having two indentations 21 symmetrically disposed on two opposite long sides thereof in the middle at the top. The heat-insulating inner box 22 fits within the housing 20, having two indentations 23 symmetrically disposed on two opposite long sides thereof in line with the two indentations 21 on the housing 20. The two transparent side cover plates 25 are respectively mounted on the two opposite indentations 21 of the housing 20. The collector panel 24 is mounted within the heat-insulating inner box 22. The transparent top cover plate 26 is covered over the top opening of the housing 20. After the collector unit was assembled, the gaps between parts thereof are properly sealed by a water sealing device.

Figure 6:
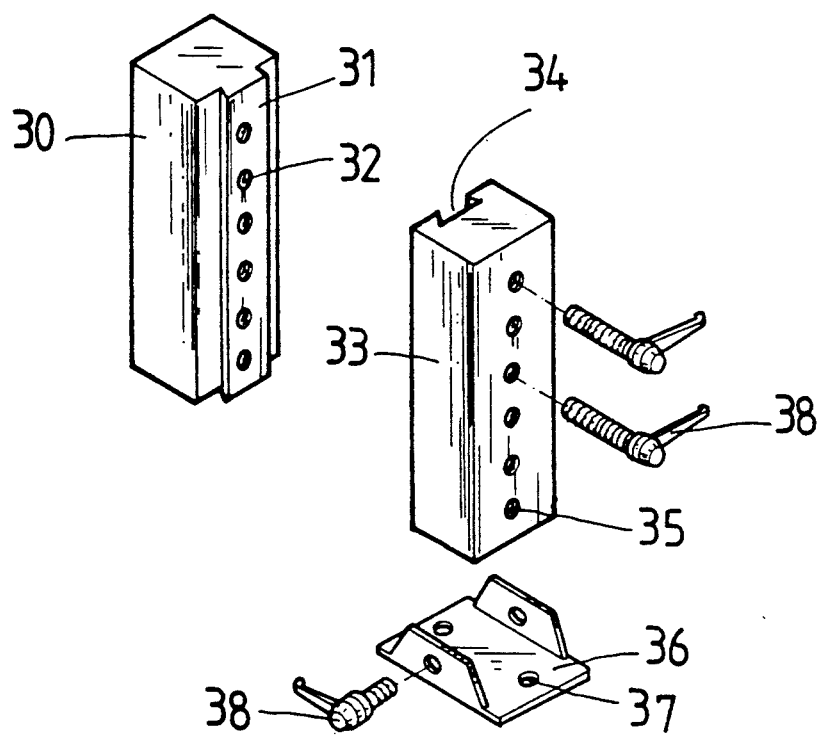
FIG. 6 is an exploded view of an elevation adjustment device according to the present invention.
Figure 7:
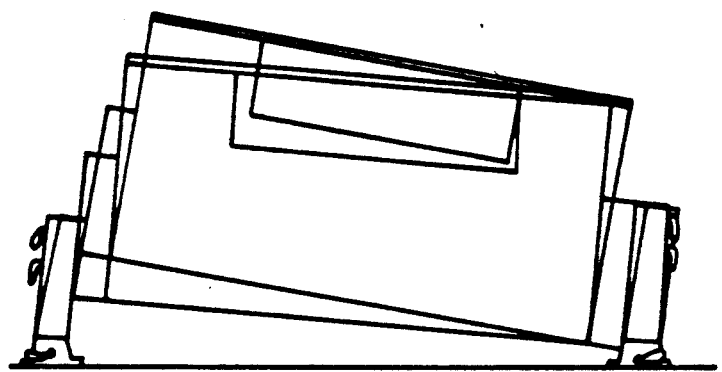
FIG. 7 is a schematic drawing showing the angle of elevation of the solar collector assembly of the present invention adjusted}

Referring to FIGS. 6 and 7, the elevation adjustment unit is comprised of four sets of elevation adjustment devices respectively fastened to the housing 20 and bilaterally disposed on the two opposite short sides thereof. Each adjustment device is comprised of a sliding bar 30, a supporting bar 33, a base frame 36, and a plurality of screw devices 38° The sliding bar 30 is fastened to either short side of the housing 20 adjacent to either corner thereof, comprising a dovetail tongue 31 disposed in the vertical direction on an outer side and a series of vertically spaced screw holes 32 on the dovetail tongue 31. The supporting bar 33 comprises dovetail groove 34 disposed in the vertical direction on an inner side, which receives the dovetail tongue 31 of the sliding bar 30, and a series of vertically spaced screw holes 35 through the dovetail groove 34 corresponding to the screw holes 32 on the sliding bar 30. The lower part of the supporting bar 33 is pivotably fastened to the base frame 36 by two screw devices 38. The base frame 36 comprises two mounting holes 37 on two opposite ends thereof for mounting on the roof of a building. As the dovetail tongue 31 of the sliding bar 30 is inserted into the dovetail groove 34 of the supporting bar 33, two screw devices 38 are threaded through two screw holes 35 on the supporting bar 33 into corresponding screw holes 32 on the sliding bar 30 to fix the sliding bar 30 to the supporting bar 33 at a desired elevation.

Figure 8A:
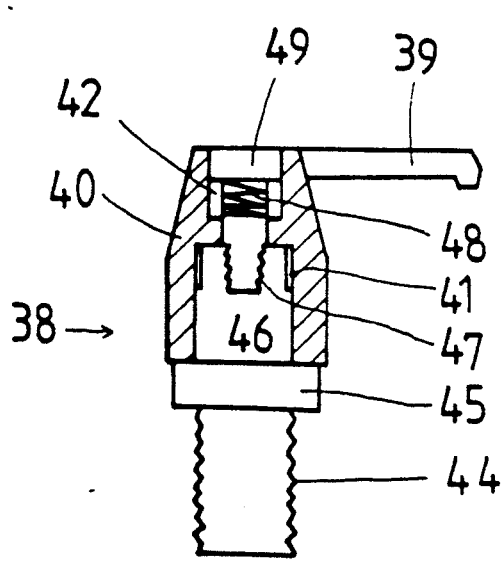
FIG. 8A is an assembly view in section of the screw device of FIG. 8.
Figure 8B:
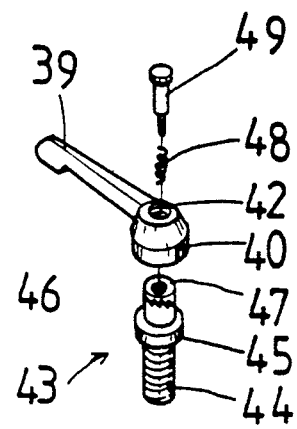
FIG. 8B is an exploded view of a screw device according to the present invention.

Referring to FIGS. 8A and 8B, the screw device 38 is comprised of a lever 39, a screw rod 43, a spring 48, a screw 49. The screw rod 43 comprises an outer thread 44 around one end thereof, a collar 45 in the middle, a series of teeth 46 around an opposite end thereof, and a screw hole 47 in the longitudinal direction within the teeth 46. The lever 39 has one end terminated to a socket 40 mounted on the screw rod 43 over the screw hole 47 and the series of teeth 46. The socket 40 of the lever 39 comprises a center through hole 42 longitudinally aligned with the screw hole 47 on the screw rod 43, and a series of teeth 41 on the inside around the center through hole 42 respectively engaged with the series of teeth 46 on the screw rod 43. The spring 48 is inserted into the center through hole 42, and then the screw 49 is inserted through the spring 48 and threaded into the screw hole 47. The screw rod 43 can be turned by the lever 39 to thread into either screw hole 35 on the supporting bar 33. Slightly lifting the lever 39 from the screw rod 43 causes the series of teeth 41 on the socket 40 disengaged from the series of teeth 46 on the screw rod 43, and therefore the lever 39 can be turned on the screw rod 43 without moving it.

Figure 9:
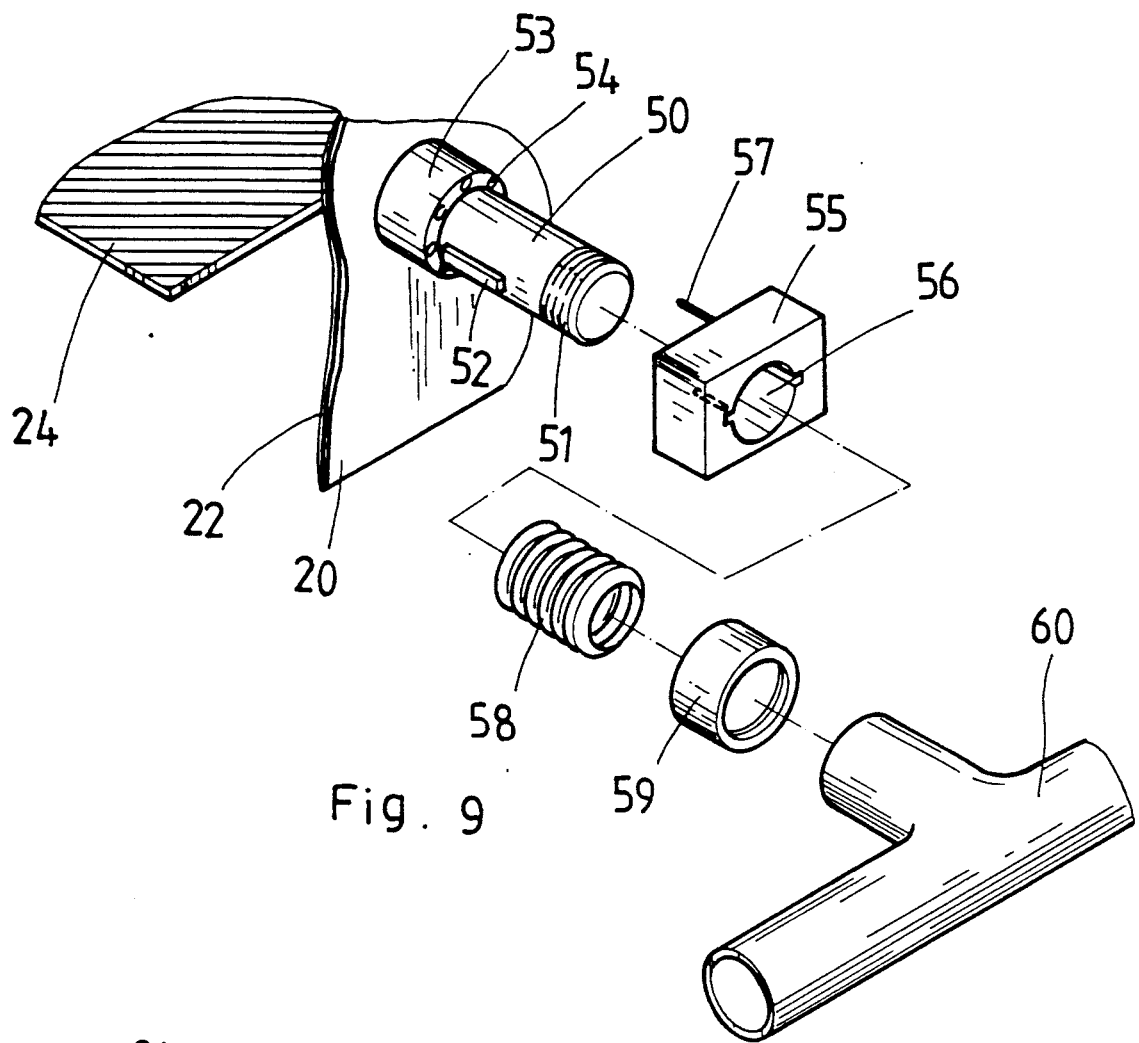
FIG. 9 is a partial exploded view of a focusing adjustment unit according to the present invention.
Figure 10:
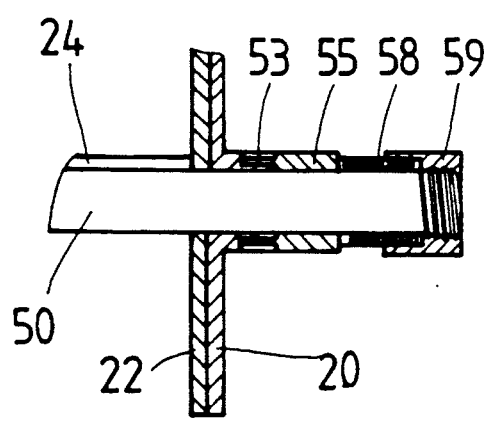
FIG. 10 is an assembly view in section of the focusing adjustment unit of FIG. 9.

Referring to FIGS. 9 and 10, the focusing adjustment unit is comprised of a collector tube 50, two graduated bushings 53, two adjustment blocks 55, two spring elements 58, and two locknuts 59. The graduated bushings 53 are respectively installed in holes (not indicated by reference numbers) on the housing 20 and the inner box 22 and aligned on two opposite locations. Each graduated bushing 53 comprises a series of pin holes 54 around the outer end edge thereof. The collector tube 50 is inserted through the graduated bushings 53 ( namely, through the housing 20 and the inner box 22) and fastened to the collector panel 24. Therefore, the collector panel 24 can be oscillated leftward and rightward by turning the collector tube 50. The two opposite ends of the collector tube 50 are symmetrical, each having an outer thread 51 and two raised strip 52 symmetrically disposed behind the outer thread 51. Each adjustment block 55 comprises a center through hole 56 fitted around the raised strips 52 on either end of the collector tube 50, and two plug pins 57 bilaterally disposed on one side thereof inserted into respective pin holes 54 on the respective graduated bushing 53 to prevent the collector tube 50 from rotary motion. The spring elements 58 are respectively mounted around either end of the collector tube 50 and disposed at an outer side relative to the respective adjustment block 55. The locknuts 59 are respectively threaded onto the outer thread 51 on either end of the collector tube 50 to stop the respective spring element 58 and the respective adjustment block 55 against the respective graduated bushing 53. When assembled, the two opposite ends of the collector tube 50 are respectively connected to a pipe system 60.

The operation of the solar collector assembly is outlined hereinafter. By loosening respective screw devices 38 for permitting the supporting bar 33 of either elevation adjustment device to be pivoted on the screw devices 38 on the respective base frame 36 and for permitting the elevation of the sliding bar 30 to be adjusted relative to the respective supporting bar 33, the housing 20 can be tilted to change its angle of elevation ( see FIG. 7 ). By loosening the locknuts 59 for permitting the adjustment blocks 55 to be moved outwards to disconnect the respective plug pins 57 from respective pin holes 54, the collector tube 50 can be turned to change the angle of inclination of the collector panel 24 ( see FIG. 10 ).

As indicated, the present invention provides a solar collector assembly which comprises an elevation adjustment unit and a focusing adjustment unit for adjusting the angle of elevation and angle of inclination of the collector panel thereof.

I claim:

1. A solar collector assembly comprising:

a collector unit, said collector unit comprising a rectangular housing internally heat insulated and covered with a transparent top cover plate and two opposite transparent side cover plates, a solar collector panel disposed inside said housing for the absorption of solar radiation passing through said transparent top cover plate and said transparent side cover plates;

an elevation adjustment unit for adjusting the angle of elevation of said collector unit, said elevation adjustment unit being consisted of four sets of elevation adjustment devices, each elevation adjustment device being comprised of a sliding bar fastened to either corner of said housing on the outside, a base frame, and a supporting bar pivoted to said base frame to support said sliding bar, and screw devices to fix said sliding bar and said supporting bar in the adjusted position, said sliding bar having a series of vertically spaced screw holes on a longitudinal dovetail tongue thereof, said supporting bar having a dovetail groove engaged with said dovetail tongue, and a series of vertically spaced screw holes corresponding to the vertically spaced screw holes on said sliding bar, into which said screw devices are alternatively threaded; and a focusing adjustment unit for adjusting the angle of inclination of said solar collector panel sideways, said focusing adjustment unit comprising two graduated bushings fastened in holes on two opposite short sides of said housing, each graduated bushing having a series of pin holes around a respective outer end edge, a collector tube fastened to said solar collector panel and turned to oscillate said solar collector panel sideways, two adjustment blocks respectively mounted around said collector tube on two opposite ends thereof outside said housing and made to slide on said collector tube longitudinally, said adjustment block having plug pins alternatively inserted into the pin holes on either graduated bushing, stop means to prevent said adjustment blocks from rotary motion relative to said collector tube, two locknuts fastened to two opposite ends of said collector tube through screw joints, and two spring elements mounted around said collector tube and respectively retained between said adjustment blocks and said locknuts.

2. The solar collector assembly of claim 1 wherein each screw device of said elevation adjustment device is comprised of a screw rod having a collar in the middle and a screw hole on one end and a series of teeth around the screw hole, a lever having one end terminated to a socket mounted on said screw rod, said socket comprising a center through hole and a series of teeth surrounding said center through hole and meshed with the series of teeth on said screw rod, a spring inserted in the screw hole on said screw rod, and a screw inserted through the center through hole on said socket and threaded into the screw hole on said screw rod to retain said lever to said screw rod.

* * * * *